United States Patent [19]
Phillips et al.

[11] 4,218,290
[45] Aug. 19, 1980

[54] HOT BED DESALINATION PROCESS

[75] Inventors: John R. Phillips, 911 Maryhurst Dr., Claremont, Calif. 91711; Richard N. Jacobson, Bishop, Calif.

[73] Assignee: John R. Phillips, Claremont, Calif.

[21] Appl. No.: 907,953

[22] Filed: May 22, 1978

[51] Int. Cl.$^2$ ............................................. C02B 1/04
[52] U.S. Cl. ........................................ 203/11; 203/73; 203/88; 203/100; 202/173; 202/234; 165/4; 165/104 F
[58] Field of Search ...................... 203/100, 10, 11, 88, 203/73, 71, DIG. 17; 202/173, 234, 177, 180; 55/58, 32; 165/4, 104 F, 107 R

[56] References Cited

U.S. PATENT DOCUMENTS

| | | | |
|---|---|---|---|
| 2,121,733 | 6/1938 | Cottrell | 165/4 X |
| 3,242,975 | 3/1966 | Kogan | 203/100 |
| 3,378,244 | 4/1968 | Walther, Jr. | 165/4 X |
| 3,442,769 | 5/1969 | Heinz | 203/100 X |
| 3,452,810 | 7/1969 | Schmidt et al. | 165/4 X |
| 3,459,638 | 8/1969 | Nagel | 203/100 X |
| 3,627,014 | 12/1971 | Akashi et al. | 165/4 |
| 3,843,462 | 10/1974 | Phillips | 203/11 |
| 3,935,102 | 1/1976 | Swearingen | 165/4 X |
| 4,077,849 | 3/1978 | Ziehm | 203/100 X |

Primary Examiner—Wilbur L. Bascomb, Jr.
Attorney, Agent, or Firm—Christie, Parker & Hale

[57] ABSTRACT

Aqueous saline solutions are converted in part to potable water by passing a compressed aqueous saline solution through one or more beds of contained pellets of higher temperature to heat the aqueous solution to a flash vaporization temperature, then passing the solution to one or more flash vaporization zones. Vaporized potable water from each vaporization zone is separately passed to contained bed of pellets where water is condensed and pellets heated. Simultaneously, a bed of pelletized solids is heated to supplant the highest temperature bed in the system used for heating. By selective switching of beds, the system is kept in continuous operation with a heated bed of pellets replacing the highest temperature bed previously used to heat the aqueous saline solution. The bed used for water condensation is transferred to the heating cycle for subsequent introduction to the system.

15 Claims, 5 Drawing Figures

Fig. 5

HOT BED DESALINATION PROCESS

BACKGROUND OF THE INVENTION

The present invention is directed to recovery of fresh or potable water from aqueous saline solutions from brine such as sea water and brackish water where heated pellets are used to transfer heat to the aqueous saline solution followed by flash vaporization and condensation of water on relatively cool pellets.

With drastic changes in the world energy situation and associated increases in the cost of materials, desalination processes must take a new direction. In areas where energy is no longer cheap, it appears the processes must utilize the lowest amount of and lowest cost of energy. For areas where energy is still plentiful and cheap, the emphasis for future desalination must be on reduced capital cost.

The present invention is directed to a more efficient use of energy and reduced capital cost in the field of desalination by the use of pellets.

Distillation remains the best method developed yet for large scale desalination. The manner by which heat is transferred is the heart of any desalination process. Desalination methods are described in various patents and articles. Reference is made to U.S. Pat. Nos. 3,390,078, 3,242,975, 3,640,850, 3,843,462, "Energy and the Future of Desalination: The Role of Calex," Tenth Intersociety Energy Conversion Engineering Conference, Phillips et al (1975), and "Principles of Desalination," Woodward et al, Academic Press, Chapter 4, page 117 (1966), all incorporated herein by reference.

Of the above, U.S. Pat. No. 3,843,462 issued to one of us is the most relevant and describes a process where the aqueous saline solution, to undergo desalination, is passed countercurrent to the flow of hot balls. The heated aqueous saline solution is flash vaporized and the vapors evolved condensed on moving hot balls with intermediate heating of hot balls for use in the heating cycle of the process.

A need was found to exist to improve such a process to reduce capital cost, improve thermodynamic efficiency, eliminate the energy required to move large volumes of heat transfer pellets through the system and avoid mechanical problems.

SUMMARY OF THE INVENTION

The present invention is directed to improvements in processes for recovery of potable water from aqueous saline solutions wherein a pressurized aqueous saline solution is heated by contact with pellets to a temperature sufficient for flash vaporization of the aqueous saline solution with attendant cooling of the pellets and wherein the heated aqueous saline solution is flash vaporized to yield vapors of potable water which are condensed by contact with pellets relatively cool with respect to the temperature of the vapors.

The improvement resides in use of at least one contained high temperature bed of pellets for heating the aqueous saline solution while at least another is used to condense potable water evolved from a flash vaporization zone while another is heated to replace the high temperature bed when it becomes too cool to be functional.

More particularly, a first bed of pellets contained in a chamber and maintained in a static to fluidized state by the flow of pressurized aqueous saline solution is used to supply heat to the aqueous saline solution to a flash vaporization temperature. Upon flash vaporization, potable water is vaporized and condensed by contact with a second bed of pellets contained in a chamber with recovery of a portion of the heat extracted from the first bed by the pellets of the second bed. Simultaneously, a third bed of pellets contained in a chamber is heated for use to replace the first bed.

After a predetermined temperature and/or time interval, fluid flow is switched whereby the aqueous saline solution is caused to flow to the heated third bed of pellets, water is condensed in the first bed of pellets and heat is supplied to the partially heated second bed of pellets.

After another such interval, fluid flow is again switched whereby the pressurized aqueous saline solution is caused to flow to the heated second bed of pellets, potable water is condensed in the third bed of pellets and heat is supplied to the first bed of pellets.

The above forms a cycle of operation which is continuously repeated throughout operation of the system for recovery of potable water.

In the preferred operation, the aqueous saline solution is pressurized and heated to a temperature sufficient to achieve flash vaporization of the aqueous saline solution by passing the aqueous saline solution from a first bed of contained pellets through a plurality of beds of contained pellets in series to a contained bed of pellets of highest temperature. Each bed of the series in the direction of flow of the aqueous saline solution is of higher temperature than the previous bed of pellets for transfer of heat from the pellets to the aqueous saline solution with cooling of the pellets.

The heated aqueous solution from the bed of pellets of highest temperature is passed to the first of a plurality of flash vaporization zones in series ending in a last flash vaporization zone to stagewise flash vaporize potable water from the aqueous saline solution by pressure reduction in passage from one flash vaporization zone of the series to the next.

The flash vaporized potable water from each said flash vaporization zone is passed to an associated contained bed of pellets coupled in flow relation to the flash vaporization zone. Potable water is condensed on the surface of the pellets with transfer of heat of condensation to the pellets. As a consequence, the bed of contained pellets coupled to the first flash vaporization zone of the series becomes a bed of pellets of highest temperature for water condensation. The contained bed of pellets coupled to the last flash vaporization zone becomes a contained bed of pellets of lowest temperature on which water is condensed.

Simultaneously, a contained bed of pellets is heated to the highest temperature used in the series of contained beds of pellets for heating the aqueous saline solution.

Again at at selected interval, flow of the pressurized aqueous saline solution to the lowest temperature contained bed of pellets in the series used for heating the aqueous saline solution is discontinued and introduced to the next highest temperature bed of the series.

Flow of partially heated aqueous saline solution is also introduced to the previously heated contained bed of pellets. Flow of the heated pressurized aqueous saline solution to the previous first flash vaporization zone of the series is transferred to the next flash vaporization zone of the series. This removes from service the previous high temperature bed of contained pellets used to condense water. This bed is transferred to the heating operation to raise the pellets to a temperature suited for use in heating the aqueous saline solution.

Finally, a flash vaporization zone and coupled contained bed of pellets is coupled to the end of the series of flash vaporization zones such that the same number of beds are used for heating and water condensation.

This sequence is endlessly repeated during the process of collecting potable water.

In sum, a multiplicity of beds are used to heat the aqueous saline solution while a multiplicity of beds are used to condense water while a bed is heated for service. The beds used for heating progress downwards with each cycle change, while the beds used to condense water progress upwards. In this progression, the bed which was the coolest bed in the series for heating becomes the coolest bed in the series for condensing water so it can begin to accumulate heat in its progress of the series. Most preferably, this bed goes through a step of washing to remove any entrained solids.

In the most preferred operation, the collected water passes through all of the beds used for water condensation for heating cooler beds of the series.

THE DRAWINGS

FIG. 4 illustrates the detail and operation of a hot bed desalination chamber, while;

DETAILED DESCRIPTION

The process of the present invention employs contained beds of solid pellets in a static to fluidized state, preferably in a semifluidized to fluidized state, by flow of an aqueous saline solution or potable water flow therethrough by heating and water condensation.

The pellets alternately serve to heat an aqueous saline solution to undergo flash vaporization or condense water formed by flash vaporization. As a consequence, a substantial portion of the heat removed from the pellets in the heating step is recovered in the condensation step.

As used herein, the term "aqueous saline solution" means water containing salts in too great a concentration to be used as potable water and is interchangeably used with the term "brine" which includes sea water and brackish water.

As used herein, the term "pressurized aqueous saline solution" means an aqueous saline solution which is at a pressure sufficient to bring about vaporization of the contained water at a temperature of at least 85° F., which can be a pressure less than atmospheric for temperatures ranging from 85° F. to 212° F. and a pressure greater than atmospheric for temperatures above 212° F.

Figure 1:
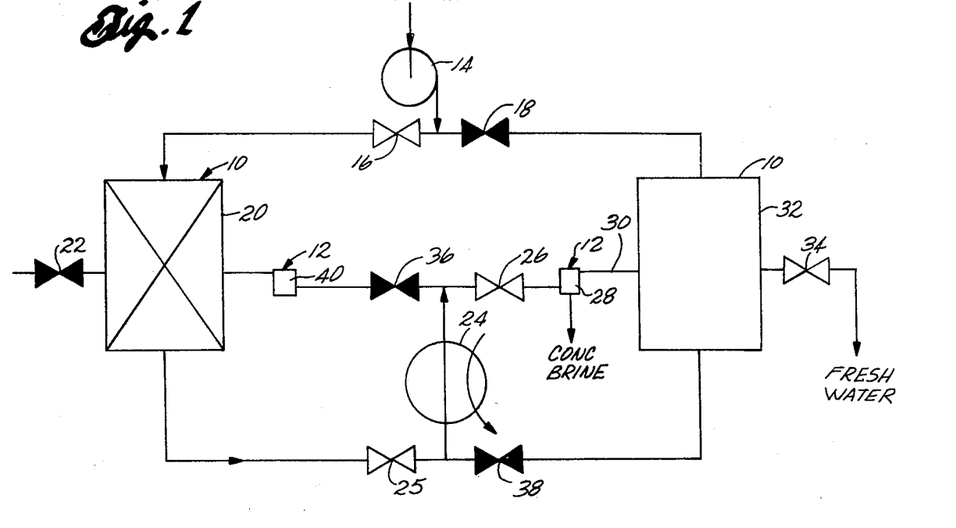
FIG. 1 illustrates the basic concept of the process of this invention.

With reference to FIG. 1, and intrinsic to all operations contemplated by the invention, is a bed or a chamber 10 of contained pellets of iron, stainless steel, aluminum, and the like, normally of a particle size from about ⅛ inch or less to ½ inch or more. Associated with the chamber of contained pellets is a flash vaporization chamber 12, whose use is dependent upon the mode of operation of the bed to which it is coupled in flow communication.

In the simplest form, brine passes through a pump 14 which serves to compress the brine to a pressure sufficient to achieve flow in the system. Alternatively, a vacuum pump (not shown) can be used to achieve flow in the system. By the opening of valve 16 and closure of valve 18 the aqueous saline solution of brine passes through bed 20 with valve 22 closed. Pellets contained in bed 20 are initially at a temperature above the temperature of the incoming brine. Heat is transferred from the agitated pellets to the brine and, in turn, the pellets are cooled. The heated pressurized brine passes outward of bed 20 through valve 25 through a supplemental heating means 24. The brine may be directly or indirectly heated, preferably heated, by one or more additional beds of pellets. The brine, now at a temperature and pressure suitable for flash vaporization, is passed through valve 26 to vaporization zone 28 where, through a release in pressure, potable water is vaporized and the brine concentrated with the salts remaining dissolved and/or suspended in the brine. The vapors pass through line 30 to the condensation zone 32 which is also a contained bed of pellets. There water condenses and is recovered by passing through open valve 34.

In continuous operation of this mode, the pellets contained in bed 20 will become progressively cooler with use while the pellets in condenser 32 will become progressively hotter due to extraction of heat of condensation from the condensed vapors. The total load on the heat exchanger will also increase.

When heat transfer becomes uneconomical, e.g., at least when the temperature of the pellets in chamber 20 approaches that of the brine, and normally at some intermediate interval, the sequence is switched. Valves 18, 22, 36 and 38 are opened and valves 16, 25, 26 and 34 closed. This becomes the second mode of operation.

The incoming brine will now pass through valve 18 and through the pellets contained in zone 32 to extract the heat contained therein by virtue of condensation of the potable water and will then pass through valve 38, the heating means 24, valve 36 and flash chamber 40 to bed 20. In this mode, the pellets contained in bed 20 are reheated by virtue of condensation of the vaporized potable water while the incoming brine is heated in part to its desired temperature by the pellets contained in zone 32 which became heated in the first mode. Upon completion of two modes of operation, one cycle of operation is complete. The process is made continuous by repetition of the cycles wherein one bed of pellets serving as a heating means as the other bed of pellets is being heated by serving as a zone of water condensation.

The time of a cycle is determined by the process variables of the flow rate and vessel size. Normally, sufficient time is made available for the inherent heat transfer operations of the process to approach equilibrium conditions. Heat transfer rates for steam flashing condensation, liquid brine heating, pellet heating, cooling can be readily calculated and are quite fast. Therefore, short operating cycle times are entirely feasible for the process.

As indicated, the heat means is preferably another bed of pellets. Such a system is schematically depicted in FIG. 2.

Figure 2:
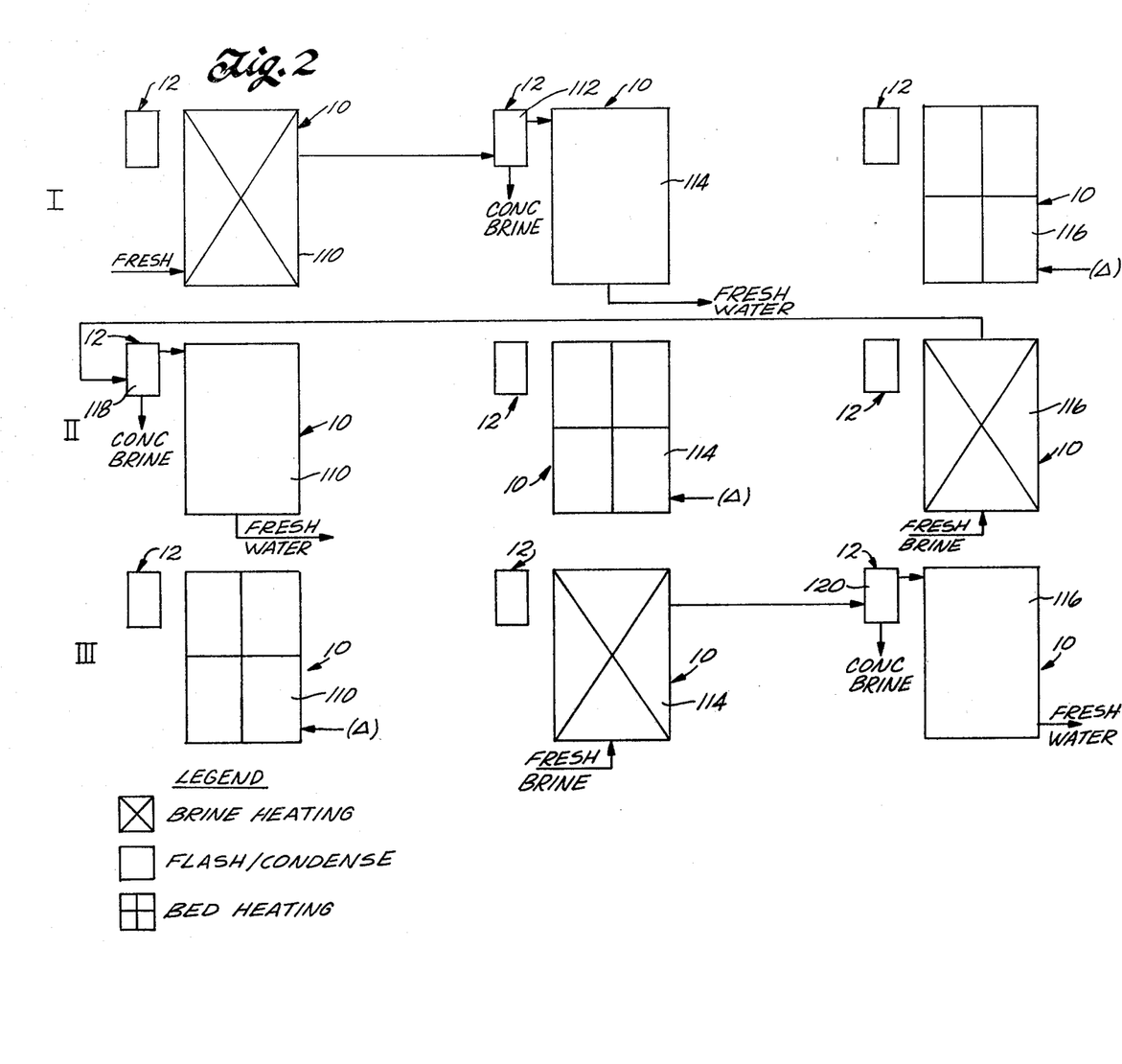
FIG. 2 illustrates the basis of the preferred mode of operation.

With reference to FIG. 2, which represents the basis of the preferred system, a bed of pellets undergoes heating during the same time another bed is used for brine heating and a third for water condensation with attendant heat extraction by the contained pellets. Each unit consists of a bed of pellets 10 and a flash vaporization zone 12. There is shown the sequence flow but not the piping and valve arrangements used. These will become apparent to one of ordinary skill in the art.

In the first mode of operation (I), fresh brine enters under compression to heated bed 110 and passes to flash vaporization zone 112 and then to condensation bed 114. Simultaneously, a bed of pellets 116 is being heated for the second mode (II). While a switch from mode I to mode II can occur at any time, it will be readily apparent that the limit of time for operation of mode I is the point where insufficient heat remains in the pellet of bed 110 to raise the brine to a temperature sufficient for flash vaporization to occur in vaporizer 112.

At the end of mode (I), the situation is such that pellet bed 116 is at a temperature sufficient for heating the brine, bed 110 is in a cooled state and bed 114 is in a partial heated state, heat being derived from condensation of vapors from flash vaporizer 112.

By switching of valves (not shown) operational mode (II) is set into play. In mode (II), a bed 116 serves to heat the brine to a temperature sufficient to achieve flash vaporization in vaporization zone 118. The potable water resulting from flash vaporization is cooled and condensed in bed 110 to achieve a supply of fresh water. The pellets in bed 110 accumulate heat of condensation. Bed 114, having been partially heated by condensing vapors, is heated to a temperature consonent for use in heating fresh brine.

After a selected time interval, which is normally short of the time at which the bed 116 becomes too cold to achieve flash vaporization in flash vaporizer 118, mode (III) is set into play. Bed 114, having been heated by a supply of external heat (Δ), becomes the bed for heating the brine for flash vaporization in vaporizer 120. Bed 116 becomes the bed for condensing the flashed vapors of potable water, while bed 110 is returned to a temperature suitable for processing of fresh brine.

At termination of the operation of mode (III), the cycle is complete and the operation reverts back to mode (I).

Figure 3:
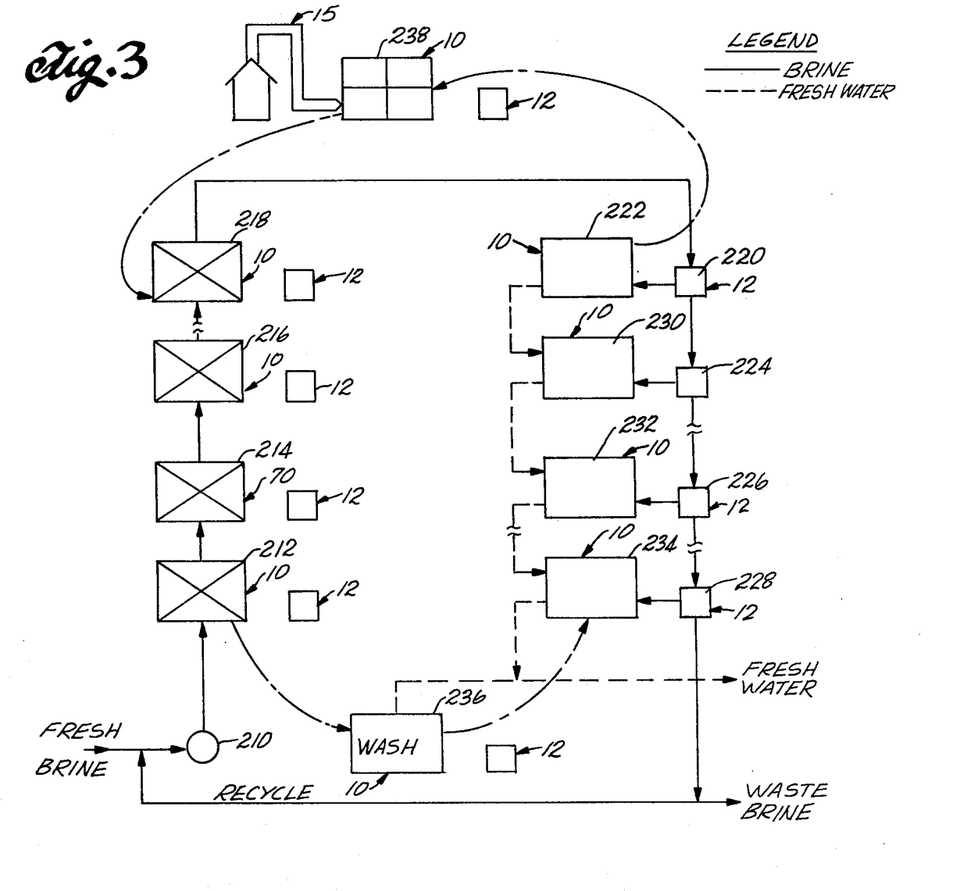
FIG. 3 illustrates the detail of an operating system employing the concepts of FIGS. 1 and 2.

While the operation depicted is competant to carry out the process of the invention and employs the basic principle of FIG. 1, FIG. 3 illustrates the use of a full scale multi-bed system for both heating and condensing of flashed vaporized potable water with a sequence of change of beds for continuous operation. Again, the piping and valving are omitted for simplicity, but it is recognized that the sequence of flow can be changed from one bed to another by simple and rapid rearrangement of the vaves with timed computerization employed for optimum operation.

Rapid changing valves which can be timed or quickly controlled such as through electronic computerization are commercially available and such commercially available valves can be used in the process of this invention. For example, the characteristics of the nonproprietary control valves listed in Table 1 on page 139 of the *Chemical Engineering Deskbook Issue*, Apr. 3, 1978, and which is incorporated herein by this reference, are suitable for use in the practice of this process. Further, suitable electric control valves for use in the practice of this process are listed on page 179 of the *Chemical Engineering Deskbook Issue*, Apr. 3, 1978, and incorporated herein by this reference. The ability to utilize such valves to rapidly change flow of fluid and thereby impart the characteristics of a moving bed to a fixed bed is known to those skilled in the art as is shown by the Sorbutene process shown on page 64 of *Chemical Engineering*, Feb. 13, 1978 issue which is incorporated herein by this reference.

Basic to the units are the bed of pelletized solids 10, a flash vaporization chamber 12 and a source of heat 15.

With reference to FIG. 3, fresh brine enters the compressor 210 and is compressed to a pressure consonent with the flow required to achieve staged heating and enable staged flash vaporization. The brine enters bed 212, which is the coolest bed in the heating sequence of this mode, and receives a portion of its heat. To achieve the temperature desired for flash vaporization, the brine passes sequentially to beds 214, 216 and on to final bed 218 where it reaches a final temperature for passing to the first flash vaporization zone 220. In flash vaporization zone 220, a portion of the potable water is vaporized and passed to contained bed of pellets 222 transfering on condensation a portion of its heat to the contained pellets. The brine flows with stagewise pressure drop through vaporizers 224, 226 and on to 228, while potable water vaporized from each is respectively condensed in pelletized bed condensers 230, 232 and finally 234. In the train, bed 222 is the pelletized bed of highest temperature whereas bed 234 is a pelletized bed of low temperature in the water condensation cycle.

Preferably, fresh or potable water passes from bed 222 downward to bed 234 and out as a product. Alternately, water can be separately recovered from each bed. A portion may be passed to bed 236 for washing to cleanse the surface of the pellets of any entrained salts or other deposits.

Simultaneously, bed 238 undergoes heating for introduction into the system at a desired time, usually at a time when bed 212 approaches a temperature of the incoming brine.

When a switch is made, bed 222 reverts to the condition of bed 238 which is placed into operation to supplant bed 218 as the highest temperature bed in the heating train. Down the train bed 216 supplants bed 214 which in turn supplants bed 212. Bed 212 reverts to wash and bed 236, which was in the wash mode, supplants bed 234 which supplants bed 232, which in turn supplants 230. Bed 222 is removed from operation and heated as bed 238. There is in effect a continuous rotation of the beds and their associated flash vaporization chambers with the beds serving the function of heating the brine, condensing flash vaporized potable water or undergoing heating and, if necessary, washing to remove any entrained salts. Yet, there is no net movement of pellets, only a change in flow of fluid.

A cycle may be considered complete when there is a switch of beds. With the rapid valve changes, for all intensive purposes the operation is continuous.

The residence time of the brine in any given chamber can range from about one second to about one hour depending on the size of the chamber and the flow rate employed in the system. Total cycle time to process a volume of brine through the system depends on the residence time in a chamber and the number of chambers. At the fast end of the time range for chamber residence time, a control valve is selected which can provide the necessary fast valve changes. Alternatively to using selected residence times for the brine in a chamber, the process can be controlled by temperature change relationships. For example, the temperature in the hottest brine heating chamber can be monitored and when the temperature of the solids has dropped to within a selected temperature difference (e.g. 1° F.) of the brine in the bed, the valving can be activated to remove the brine from the chamber. A switch could also take place when the temperature of the solids drops by some predetermined amount (e.g. 8° F.) or to a selected temperature, if the temperature of the brine is being monitored, then the brine can flow to another chamber when the temperature of the brine rises to a selected temperature or reaches a selected temperature.

In the presently preferred operation, 52 beds are used for brine heating, 52 beds for vapor condensation, one bed undergoing heating and one bed idle or undergoing washing. In this operation, the pellets undergoing heating may be heated directly by high pressure steam or combustion gases from a fired heater. Waste heat may be advantageously used.

In carrying out the process of the invention, the pressurized (pressure may be below one atmosphere) brine to achieve flash vaporization must be at a temperature from about 85° F. to the critical temperature of the aqueous saline solution. Generally, the temperature ranges from about 240° F. to about 650° F., more preferably, from 400° to 450° F.

Whatever the manner in which the process is carried out, whether it is simplified to its most complex form, the bed in which water is condensed must be clean such that the water vapors will not be contaminated upon the condensation. This may be achieved simply by the fact that when the aqueous saline solution is heated, the inorganic materials having invert insolubility curves remain suspended in the saline water. Little, if any, of the solids are carried over in the flash vaporization. However, to the extent that in operation salts are carried over, washing of the final bed in the system is sufficient to maintain the pellets adequately cleaned for continuous operation.

Figure 4:
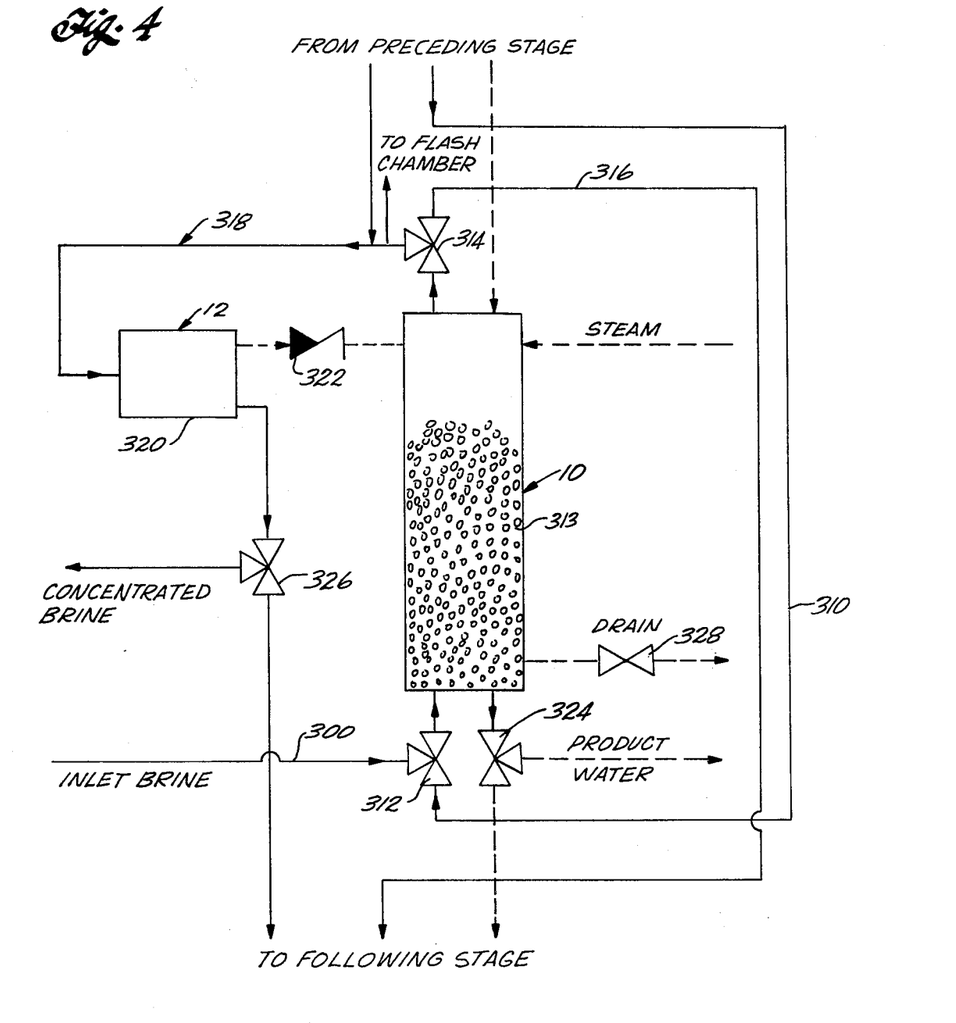

A detail of a single bed is shown in FIG. 4. When in the heated stage, the incoming brine in line 300 or line 310 from another cooler bed flows through 3-way control valve 312 for entry into chamber 10 containing the heated pellets 313. The heated brine is passed by 3-way valve 314 to a flash chamber or by line 316 to a next following heating stage or flash vaporization.

When this mode of operation is complete, the chamber 10 containing the pellets serves as a condensation chamber. In this instance, brine from a preceeding stage passes by line 318 to flash vaporizer 320 and by check valve 322 to bed 10 where potable flashed vapors enter the pelletized bed and condense on the surface of the pellets giving up their heat to the pellets. The water, which is collected, passes out the 3-way valve 324 either as product water or a portion thereof can pass to a next stage which may be a washing stage. A concentrated brine passes from flash vaporizer 320 to 3-way valve 326 where it is removed as a concentrated brine or passes at a reduced pressure to a next following flash vaporization stage.

To heat the pellets, steam may be introduced at the top of pelletized bed 10 and passed downward to exit through drain valve 328. The same flow arrangement may be used for the washing cycle.

The valving arrangement may be such that there is a downward flow for vapor condensation, pellet heating and pellet washing and an upward of brine during brine heating. Thus, beds of solid pellets may be alternately compacted and expanded to maintain them in an agitated state to eliminate scale formation.

The process of this invention can be energized in several ways depending on the particular situation. In FIG. 1 energy is shown, schematically, to be added in a conventional indirect manner to the incoming brine using, for example, steam or combustion gases. Metallic tube and shell heat exchangers or more recently developed thin plastic heat exchangers can be employed in this service.

Elimination of conventional heat exchange is a primary goal of the process as illustrated in FIGS. 2 and 3. The process can be effectively energized by externally heating one of the pellet chambers so that brine subsequently coming in contact with these pellets is further heated to the point where the process becomes operable.

In areas where energy is scarce and expensive, the future of desalination probably lies in the utilization of low temperature energy as discussed in "Energy and Future of Desalination: The Role of Calex," Tenth Intersociety Energy Conversion Engineering Conference, Phillips and Yen (1975), incorporated herein by reference. For this situation it is quite feasible that vapor recompression will prove to be the optimum way to operate. Although not illustrated, the incorporation of vapor recompression into the process of this invention is relatively straightforward. Brine from the last, lowest temperature, flashing chamber would be flashed again in an additional chamber containing no pellets. The vapor would be compressed and thus heated and returned to heat the pellets in one of the chambers. Reject steam from a power plant could also be employed.

For high temperature operation, pellets in the chamber to be heated externally can be heated by high pressure steam or directly by combustion gases from a fired heater. Table 1 contains an estimate of the value of the heat transfer coefficients that can be expected for the latter type of operation. It is believed that the process can be efficiently and quickly energized in this manner. Operation of this type of heater is described in *Chemical Engineers Handbook*, 4th Ed., Perry, McGraw-Hill (1963), incorporated herein by reference.

TABLE 1

| HEAT TRANSFER COEFFICIENTS* HOT BED DESALINATION | |
|---|---|
| | h(Btu/ft$^3$hr °F. |
| Forced Convection | |
| Gases | .92 × 10$^3$–9.2 × 10$^3$ |
| Water | .46 × 10$^5$–9.2 × 10$^5$ |
| Condensing vapors | .92 × 10$^5$–92 × 10$^5$ |

*"Transport Phenomena," Bird, R. B., et al, p. 393, Wiley, New York (1962), based on specific area of 460 ft$^2$/ft$^3$.

For short cycle times, the time allowed for the heating of brine, the condensing of steam, and the heating and cooling of pellets in one time interval can be small. The transient times associated with maintaining the solids at a relatively uniform temperature are short compared to the time intervals contemplated.

For any given maximum operating temperature, it is possible to investigate the relationship between number of stages and minimum heat requirements. The minimum heat requirement, per pound of product, is primarily determined by the temperature of the brine entering the hottest brine heating chamber; the temperature drop taken in the first (hottest) of the flash chambers; and the maximum brine temperature. A fourth consideration is, of course, the efficiency associated with external heating.

The preferred multi-stage process described earlier and represented in FIG. 3, is one consisting of 52 chambers in the service of brine heating, 52 chambers in the service of flashing and condensing, one chamber being washed and one being externally heated. The nominal operating temperature is about 400° F. For a given time interval, the overall heat balance is about 96,100 Btu removed from the solids in the brine heating chambers and about 92,100 Btu added to the solids in the condensing chambers. The difference in these two figures, $1.7 \times 10^6$ Btu per hour, is the minimum heat required for the process. In addition, the heat required for the process may be obtained from an overall energy balance which takes into account the enthalpies of all entering and exit streams, and the external work done on the process. In this example, on the basis of one hour of operations, $\Delta H = 1.72 \times 10^6$ Btu and $W \sim = 0.1 \times 10^6$ Btu which results in a minimum heat requirement of about $1.6 \times 10^6$ Btu. This is equivalent to an energy input of 44.7 Btu/lb. of product, or a performance ratio of 22.4.

Table 2 presents minimum heat requirements for several maximum operating temperatures for a 106 chamber plant. These conditions are not considered to be optimum for any particular situation, but illustrate the type of thermodynamic efficiencies to be expected.

TABLE 2
ENERGY REQUIREMENTS*
HOT BED DESALINATION

| Maximum Temperature, °F. | Energy Required Btu/lb. product |
|---|---|
| 400 | 44.7 |
| 300 | 43.7 |
| 200 | 45.3 |

*Calculated energy requirements for a 106 chamber plant.

Figure 5:
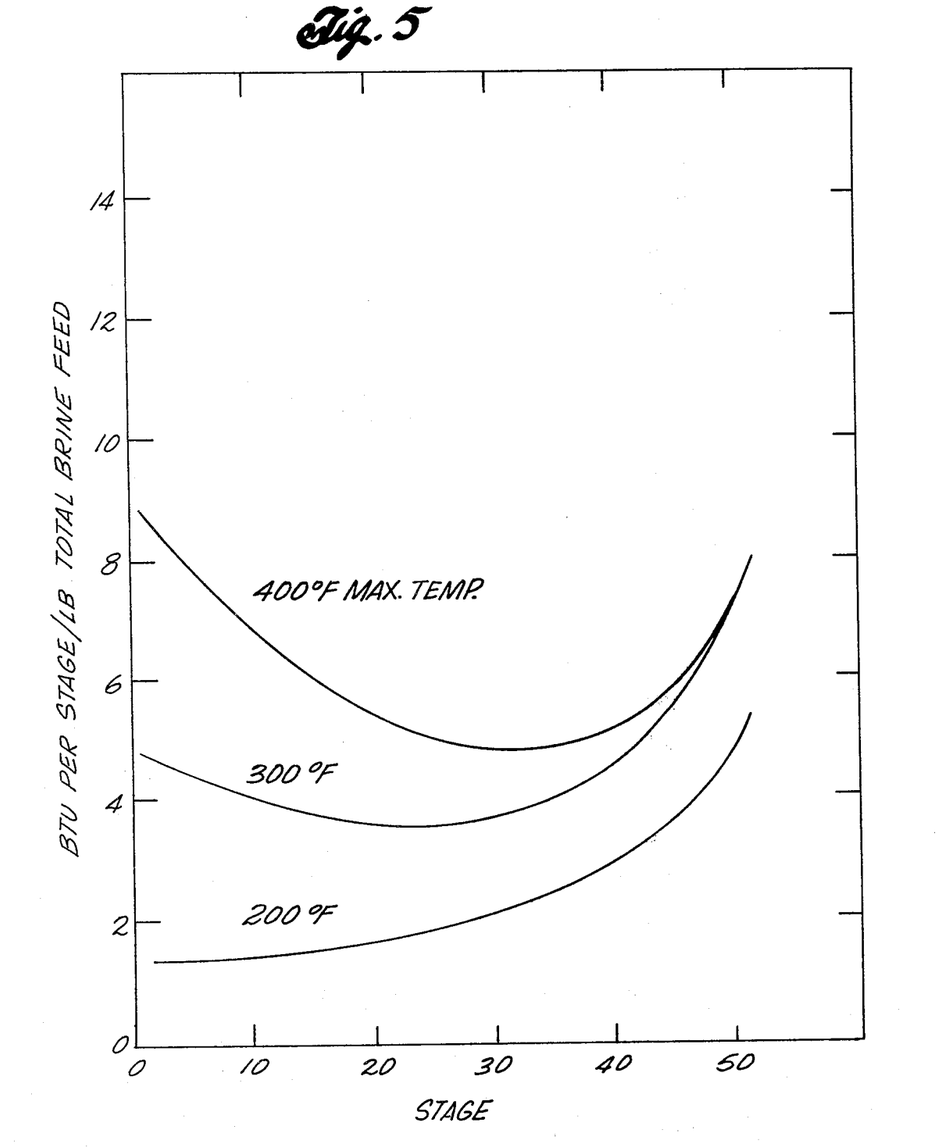
FIG. 5 illustrates the amount of heat transferred per stage for a system operating with 52 stages of heating.

When flash chambers such as those employed in the present process are operated in their most efficient manner, the heat transferred in each chamber may not be the same. FIG. 5 shows calculated values of the heat transferred per chamber as a function of operating temperatures for 52 chambers operating in this manner. The total heat transferred in the condensing chambers may be obtained by integrating under these curves.

Hot bed desalination has certain features which represent significant advances in the state of the art. Because of the inherently efficient heat transfer between a fluid and a bed of solids, very little energy is lost due to thermodynamic irreversibilities. Heat is transferred only twice, and conventional heat exchangers may be eliminated. Energy can be added as heat or through vapor recompression. In addition, the process enables relatively low temperature operation in which waste heat can be utilized.

The principal advantages of the new process over the Hot Ball process of U.S. Pat. No. 3,843,462 issued to one of us are reduced capital costs, improved thermodynamic efficiency, elimination of the energy required to move large volumes of heat transfer particles and the avoidance of mechanical problems.

EXAMPLE

The process is illustrated by considering a plant which produces 100,000 gallons per day of salt-free water in accordance with the teachings of this invention. In this example the plant consists of a total of 106 chambers. At any given time, 52 of the chambers are in the service for vapor condensation, 52 of the chambers are in the service of heating incoming brine, one of the chambers is in the service of super heating the pellets and one in which the solids are washed or drained of fluid. Cycle time is 15 minutes. This results in a fluid residence time in each chamber of 8.65 seconds, which is also the time interval between switching valve positions. This residence time may be increased or decreased by changing either the cycle time or the number of stages. For the present Example and with reference to FIG. 3, each chamber 10 contains 5,350 pounds of 3/32 inch diameter iron spheres which are employed as the heat storage and transfer medium.

The process will first be described for one time interval in a given cycle. A second time interval will then be briefly described so that both the cyclic nature of the process and the fact that the process approximates continuous behavior is illustrated.

In this example, 298 pounds of fresh brine enter the process during a given time interval at 86.4° F. The brine is compressed to an absolute pressure of 247.3 pounds per square inch and then enters the first brine heating chamber at essentially 86.4° F. and 247.3 psia. In the first chamber the brine is heated to a temperature approximating the initial temperature of the solids, in this case 100.3° F. The time interval is such that before colder brine starts to break through the solids bed, a change of valve position causes the incoming brine to enter the next bed in the sequence which is during the first time interval, the higher temperature bed. During the first time interval, brine in the heating chamber immediately downstream from the first heating chamber is heated to 107.7° F. This process is repeated in all heating chambers and the brine leaving the highest temperature heating chamber is at 400° F.

Still considering the first time interval, that hot brine which during the previous time interval was heated to 400° F., enters the highest temperature flash chamber. The equilibrium pressure of the highest temperature flash chamber is set at 225.6 psia. Part of the brine stream vaporizes upon entering this chamber until the equilibrium temperature of 392° F. is achieved. The salt-free vapors (about 3.1 pounds) are then separated from the remaining brine and condensed on the surface of the relatively cool iron spheres. As a result, the iron spheres, initially present at about 382.2° F., are heated to about 390° F. The heat transferred on the chamber during this time interval is about 2570 Btu.

Again during the first time interval, pressure in the flash chamber immediately downstream from that just described is at 201 psia. Brine entering this chamber is again partially vaporized until an equilibrium temperature of 384.2° F. is reached. In this case, about 2.96 pounds of salt-free vapor from the preceding chamber is partially vaporized and subsequently condensed adding to the amount of heat transferred in the chamber. The total quantity of heat exchanged in this chamber is 2500 Btu which heats the solids in the chamber from 374.5° F. to 382.2° F.

In like manner, the behavior of all stages in the service of flashing brine can be described. In the 52nd flash chamber the pressure is 0.956 psia and both salt-free water product (83.4 lb) and waste brine (214 lb) leave at 100.3° F. Iron spheres are heated from an initial temperature of 88.4° F. to about 98.3° F.

As can be seen from FIG. 5, the amount of heat transferred is not constant in the flash chambers but varies from chamber to chamber. This is due to the effect of temperature on both the heat of vaporization of water and heat capacity of iron. In the present example, the quantity of heat transferred per stage reaches a minimum in the 31st stage downstream from the highest temperature flash stage (about 1420 Btu) and then increases again to about 2230 Btu in the 52nd stage.

During the first time interval, one of the chambers is not in the service of either heating incoming brine or flashing brine. The solids in this chamber are heated from about 390° F. to 402° F. by contact with steam or hot gases from a fired heater. The amount of heat transferred in this stage is 3960 Btu and represents the major energy input to the process.

For the first time interval, the overall heat balance shows 96,100 Btu removal from the solids in the brine heating chambers and 92,100 Btu added to the solids on the condensing chambers. The difference in these two figures is equal to the minimum heat required for the process indicated above. In addition, the heat required for the process may be obtained from an overall energy balance which takes into account the enthalpies of all entering and exit streams, and the external work done on the process. In this example, on the basis of one hour of operations, $\Delta H = 1.72 \times 10^6$ Btu and $W \sim = 0.1 \times 10^6$ Btu, which results in a minimum heat requirement of about $1.6 \times 10^6$ Btu.

For the time interval immediately following that described above, the fluid streams are diverted such that the incoming brine is compressed and fed to the chamber which had previously been immediately downstream from the first heating chamber. In like manner each of the chambers which had been heating brine moves one step closer to the first position. The chamber in which the solids were super heated during the previous interval now serves as the final brine heating stage. The chamber which had been the first brine heating stage now undergoes washing.

Again, in the second time interval, hot brine now enters the chamber which previously had been immediately downstream from the first flash chamber. Thus all downstream chambers which had previously been in the service of flashing brine move one position closer to first. The final flash chamber is that which had undergone washing in the previous time interval. The solids in the chamber which had previously served as the highest temperature flash chamber now are super heated.

All temperatures, flows and heat quantities described for the first time interval now apply to the second time interval taking into account the changes in chamber service described above.

In fifteen minutes each chamber has been in every service required in the process, and one cycle is completed. Four cycles are completed in an hour and 100,000 gallons of fresh water are produced in a day.

The above detailed description has been used only to illustrate the essential features inherent in the present invention. It is understood that the present invention is not restricted to the specific features mentioned as other combinations and features utilizing the concepts of this invention will be obvious to those skilled in the art.

What is claimed is:

1. In a process for the recovery of potable water from aqueous saline solutions wherein a pressurized aqueous saline solution is heated by contact with pellets above the temperature of the aqueous saline solution with attendant cooling of the pellets and wherein the heated aqueous saline solution is flash vaporized to yield potable water vapors which are condensed by contact with pellets relatively cool with respect to the temperature of the vapors, the improvement which comprises:

(a) supplying at least part of the heat to an aqueous saline solution by passing said solution in contact with a first bed of contained pellets maintained in a static to fluidized state by the flow of pressurized aqueous saline solution therethrough;

(b) flash vaporizing a portion of the aqueous saline solution to generate vapors of potable water;

(c) recovering a portion of the heat supplied by condensing the vapors of potable water in contact with a second bed of contained pellets;

(d) heating a third bed of contained pellets to supplant the first bed of pellets;

(e) switching at a selected interval the flow of fluid whereby the aqueous saline solution is caused to flow to the heated third bed pellets, water vapor is condensed in the first bed of pellets and heat is supplied to the second bed of pellets;

(f) switching at another selected interval the flow of fluid whereby the pressurized aqueous saline solution is caused to flow to the heated second bed of pellets, potable water vapor is condensed in said third bed of pellets and heat is supplied to said second bed of pellets; and (g) continuously repeating steps (a) to (f) during recovery of potable water.

2. The process of claim 1 wherein said saline water is heated to a temperature ranging from about 85° F. to the critical temperature of the saline water.

3. The process of claim 1 wherein said saline water is heated to a temperature ranging from between about 240° F. to about 650° F.

4. The process of claim 1 wherein said saline water is heated to a temperature of about 400° F. to 450° F.

5. The process of claim 2 wherein said pellets are made of a metal selected from the group consisting of iron, aluminum, stainless steel and mixtures thereof.

6. The process of claim 1 wherein said switching is conducted at a selected interval of time of from about 1 second to about 1 hour.

7. The process of claim 1 wherein said switching is conducted at a selected interval dependent upon the temperature of the aqueous saline solution.

8. A process for the recovery of potable water from aqueous saline solutions which comprises:

(a) pressurizing the aqueous saline solution to a pressure sufficient to insure the aqueous saline solution will remain liquid during heating;

(b) heating the aqueous saline solution to a temperature sufficient to achieve flash vaporization of the aqueous saline solution by passing the aqueous saline solution through a first bed of contained pellets and through a plurality of beds of contained pellets in series to a contained bed of pellets of highest temperature, each bed of the series in the direction of flow of the aqueous saline solution being of higher temperature than the previous bed of pellets for transfer of heat from the pellets to the aqueous saline solution;

(c) passing the heated aqueous saline solution from the contained bed of pellets of highest temperature to a first flash vaporization zone of a plurality of flash vaporization zones in series ending in a last flash vaporization zone to stagewise flash vaporize potable water from the aqueous saline solution by pressure reduction in passage from one flash vaporization zone of the series to the next;

(d) passing the flash vaporized potable water from each of said flash vaporization zones to a contained bed of pellets coupled in flow relation to such flash vaporization zone to condense water on the surface of the pellets and transfer heat of condensation to said pellets whereby the bed of contained pellets coupled to the first flash vaporization zone of the series becomes a bed of pellets of highest temperature in which potable water is condensed and the contained bed of pelletized solids coupled to the last flash vaporization zone becomes a contained bed of pellets of lowest temperature in which water is condensed;

(e) simultaneously heating a contained bed of pellets to the highest temperature used in the series of contained beds of pellets for heating the pressurized aqueous saline solution;

(f) at a selected interval:
  (i) discontinuing the flow of the pressurized aqueous saline solution to the lowest temperature bed of contained pellets used for heating the aqueous saline solution and introducing the flow of pressurized saline solution formed in step (a) to the next highest temperature contained bed of pellets of the series used for heating the aqueous saline solution;
  (ii) diverting the flow of partially heated aqueous saline solution to the contained bed of pellets heated in step (e);
  (iii) discontinuing the flow of the heated pressurized aqueous saline solution to the highest temperature flash vaporization zone of the series and initiating flow to the heated compressed saline solution to the next lowest temperature flash vaporization zone of the series;
  (iv) introducing heat to the contained bed of pellets coupled to the flash vaporization zone from which flow of aqueous saline solution was discontinued to heat said contained bed of pellets to the temperature of the highest contained bed of pellets in the series for heating the aqueous saline solution;
  (v) adding a flash vaporization zone and coupled contained bed of pellets to the end of the series of flash vaporization zones;
  (vi) introducing the flow of pressurized heated saline water from the previous last flash vaporization zone of the series to the added flash vaporization zone and passing vaporized potable water from the added flash vaporization zone to the contained bed of pellets coupled to said flash vaporization zone;

(g) collecting potable water from the contained beds of pellets in flow communication with the flash vaporization zones; and (h) continuously repeating steps (a) through (g) during recovery of potable water.

9. A process as claimed in claim 8 in which the potable water is passed in series from the contained bed of pellets of highest temperature in which water is condensed through the intermediate contained bed of pellets to the lowest temperature contained bed in which water is condensed before recovery of potable water.

10. A process as claimed in claim 8 in which the contained bed of pellets coupled to the added flash vaporization zone is the lowest temperature contained bed of pellets to which flow of the pressurized aqueous saline solution was discontinued in step (f).

11. A process as claimed in claim 10 in which the contained bed of pellets is washed with potable water prior to use for condensing flash vaporized potable water.

12. The process of claim 8 wherein said saline water is heated to a temperature ranging from about 85° F. to the critical temperature of the saline water.

13. The process of claim 8 wherein said saline water is heated to a temperature ranging from between about 240° F. to about 650° F.

14. The process of claim 8 wherein said saline water is heated to a temperature of about 400° F. to 450° F.

15. The process of claim 8 wherein said pellets are made of a metal selected from the group comprising iron, aluminum, stainless steel and mixtures thereof.

* * * * *